(12) United States Patent
Alexander

(10) Patent No.: US 9,113,127 B2
(45) Date of Patent: Aug. 18, 2015

(54) SYSTEMS AND METHODS FOR AUTOMATICALLY SCHEDULING RECORDINGS OF PROGRAMMING EVENTS

(75) Inventor: Michael Alexander, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 861 days.

(21) Appl. No.: 12/702,090

(22) Filed: Feb. 8, 2010

(65) Prior Publication Data

US 2011/0194840 A1    Aug. 11, 2011

(51) Int. Cl.
| | |
|---|---|
| H04N 5/76 | (2006.01) |
| H04N 5/782 | (2006.01) |
| H04N 21/4147 | (2011.01) |
| H04N 21/433 | (2011.01) |
| H04N 21/458 | (2011.01) |
| H04N 21/472 | (2011.01) |

(52) U.S. Cl.
CPC ........... *H04N 5/782* (2013.01); *H04N 21/4147* (2013.01); *H04N 21/4334* (2013.01); *H04N 21/4583* (2013.01); *H04N 21/47214* (2013.01)

(58) Field of Classification Search
USPC .................................................. 386/291–299
See application file for complete search history.

(56) References Cited

U.S. PATENT DOCUMENTS

| | | | |
|---|---|---|---|
| 4,799,056 A | 1/1989 | Hattori et al. | |
| 5,021,974 A | 6/1991 | Pisculli et al. | |
| 5,247,438 A | 9/1993 | Subas et al. | |
| 6,208,799 B1 * | 3/2001 | Marsh et al. | 386/292 |
| 2002/0174430 A1 * | 11/2002 | Ellis et al. | 725/46 |
| 2002/0191954 A1 | 12/2002 | Beach et al. | |
| 2003/0198462 A1 * | 10/2003 | Bumgardner et al. | 386/83 |
| 2004/0013409 A1 * | 1/2004 | Beach et al. | 386/83 |
| 2004/0250280 A1 | 12/2004 | Allport | |
| 2006/0037047 A1 * | 2/2006 | DeYonker et al. | 725/58 |
| 2006/0136966 A1 * | 6/2006 | Folk | 725/58 |
| 2007/0039021 A1 | 2/2007 | Lee et al. | |

(Continued)

FOREIGN PATENT DOCUMENTS

| | | |
|---|---|---|
| EP | 1187467 A2 | 3/2002 |
| WO | 02054761 A1 | 7/2002 |

(Continued)

OTHER PUBLICATIONS

European Patent Office, International Searching Authority, "International Search Report" mailed Mar. 25, 2011; International Patent Appln. No. PCT/US2011/023136, filed Jan. 31, 2011.

(Continued)

*Primary Examiner* — Nigar Chowdhury
(74) *Attorney, Agent, or Firm* — Ingrassia Fisher & Lorenz, P.C.

(57) ABSTRACT

Systems and methods allow for automatic scheduling of audio/video recordings made by in a digital video recorder (DVR) or similar device. The various times during which each of the programming events will be available are determined and maintained in a list. Conflicting periods of time during which multiple programming events are simultaneously received are identified, and a schedule by which each of the programming events is to be recorded is created. Conflicts can be resolved by automatically scheduling the recording of one or more programming events to occur during a re-broadcast of the event at a different time that does not conflict with the other events.

17 Claims, 4 Drawing Sheets

(56) References Cited

U.S. PATENT DOCUMENTS

| | | |
|---|---|---|
| 2007/0079334 A1 | 4/2007 | Silver |
| 2007/0277198 A1 | 11/2007 | Yasukawa et al. |
| 2008/0075423 A1 | 3/2008 | DeBie |
| 2008/0077961 A1* | 3/2008 | Takemoto ................. 725/58 |
| 2008/0205847 A1 | 8/2008 | Yanagita et al. |

FOREIGN PATENT DOCUMENTS

| | | |
|---|---|---|
| WO | 03043320 A2 | 5/2003 |
| WO | 2005002214 A1 | 1/2005 |
| WO | 20060127211 A2 | 11/2006 |
| WO | 2007054880 A2 | 5/2007 |

OTHER PUBLICATIONS

Taxier, Karen Michelle et al. "Methods and Apparatus for Visually Displaying Recording Timer Information," U.S. Appl. No. 12/235,464, filed on Sep. 22, 2008.

Kummer, David A. "Apparatus and Methods for Resolving Recording Conflicts of a Digital Video Recorder," U.S. Appl. No. 12/360,643, filed Jan. 27, 2009.

Gratton, Max S. "Apparatus and Methods for Prioritizing Content Reception in a Digital Video Recorder," U.S. Appl. No. 12/692,928, filed Jan. 25, 2010.

* cited by examiner

Schedule 314

| Time | Rsrc | Event |
|---|---|---|
| TS1,TS2,TS3,TS4 | 1 | Event1 |
| TS2,TS3 | 2 | Event2 |
| TS4 | 2 | Event3 |
| ... | ... | ... |

315

Events 316

| Event1: | TS1, TS2, TS3, TS4 | (Scheduled) |
| Event2: | TS2, TS3 | (Scheduled) |
| Event3: | TS3, TS4 | (Scheduled) |
| ... | | |

317

Conflicts:

| Event | CnfltLvl | RscsAvail |
|---|---|---|
| Event1 | 1 | 2 |
| Event1, Event2 | 2 | 2 |
| Event1, Event2, Event3 | 3 | 2 |
| Event1, Event3 | 2 | 2 |
| ... | ... | ... |

318     319

Auto-Schedule 312

Application 310

Operating System 308

Memory 302 | Processor 304 | Input/Output 306

SYSTEMS AND METHODS FOR AUTOMATICALLY SCHEDULING RECORDINGS OF PROGRAMMING EVENTS

TECHNICAL FIELD

The following discussion generally relates to video recording. More particularly, the following discussion relates to systems and processes for automatically scheduling recordings of video programming events.

BACKGROUND

A digital video recorder (DVR) or personal video recorder (PVR) is a device that records audiovisual programming to a disk drive or other storage medium. Some DVRs are implemented as standalone devices that receive programming signals from a cable, satellite or terrestrial receiver, such as a set-top box (STB). Other DVRs can be incorporated into the STBs themselves, or into other receiver-type devices. One advantage of incorporating a DVR feature into an STB or other receiver is that electronic program guide (EPG) information can be shared between the DVR and the receiver, thereby providing great flexibility in selecting, receiving and recording desired programming.

Many DVR/receiver systems also provide the capability to view one program while recording another or to record multiple programs that are broadcast at the same time. A television viewer may wish to record multiple simultaneous broadcasts of local news, for example, or multiple sporting events that are simultaneously occurring on different channels. If the viewer's simultaneous recording demands exceed the capabilities of the receiver and/or DVR at any time, however, then the viewer will typically have to choose which programs will be recorded, thereby missing one or more desired programs. A viewer that would like to record three simultaneous programs, for example, may miss one of the desired programs if the viewer's receiver/DVR system is only able to record two programs at one time. While some recorders provide a capability to "prioritize" certain recordings over others, these devices simply use assigned "priority" of the program to determine which of the various programs will be recorded (or not recorded) at a particular time. While one or more of the desired programs may be re-broadcast at a later date or time, it is typically the viewer's responsibility to identify later broadcasts and to manually resolve any further conflicts in the recording schedule.

It is therefore desirable to create systems and methods that are able to automatically schedule program recordings based upon viewer inputs or preferences. These and other desirable features will become apparent from the subsequent detailed description and the appended claims, taken in conjunction with the accompanying drawings and this background section.

BRIEF SUMMARY

According to various exemplary embodiments, systems and methods are described for automatically scheduling programming events on a digital video recorder or similar device. If multiple programming events are broadcast so that simultaneous recording is not practical, then future re-broadcasts of the same programming are considered so that system resources are efficiently allocated while allowing for recording of as many desired events as possible.

In some embodiments, a method is executable by a processor in a DVR, STB or similar device to schedule recording of a plurality of programming events. The method suitably comprises determining times during which each of the plurality of programming events will be available, identifying a conflict in the times during which the programming events will be available, and creating a schedule using the processor by which each of the programming events is to be recorded, wherein the creating comprises automatically resolving the conflict by scheduling the recording of one of the programming events at a different time other than the time of the conflict.

Other embodiments provide a DVR, STB or other system to record a plurality of programming events. The system suitably comprises a receiver interface configured to receive the programming events, a storage medium configured to store the programming events, and a controller. The controller is configured to determine times at which each of the plurality of programming events will be broadcast, to identify a conflict in the times that programming events are broadcast, and to automatically schedule at least one of the programming events to be recorded at one of the times occurring after the conflict to thereby create a schedule in which each of the programming events is received via the receiver interface and is recorded to the storage medium.

Still other embodiments provide a method executable by a processor in a DVR or similar device to schedule recording of a plurality of programming events spanning a plurality of time slices. The method suitably comprises generating an event list using the processor, wherein the event list comprises, for each of the programming events, at least one of the time slices in which the programming event will occur, compiling a conflict list based upon the event list by the processor, wherein the conflict list identifies those time slices in which more than one of the programming events will occur, and automatically resolving the conflicts using the processor to thereby create a recording schedule by which each of the programming events is to be recorded.

These and other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and wherein:

FIG. 3 is a block diagram of an exemplary controller implementation that is capable of automatically scheduling programming events.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Various techniques and systems contemplated herein automatically resolve conflicts in a recording schedule by considering times at which one or more of the programming events to be recorded are re-broadcast. If a desired program is subsequently re-broadcast at a later time, the later re-broadcast may be recorded in place of the original broadcast, thereby freeing up resources that can be used for additional recordings at the earlier time. This concept of automatically resolving conflicts using later re-broadcasts of desired programs can, in some embodiments, supplement current priority schemes by initially placing high priority programs into the recording schedule and then automatically resolving any conflicts by shifting recording of lower priority programs to later re-broadcast times. These and other features of various exemplary embodiments are described in additional detail below.

Figure 1:
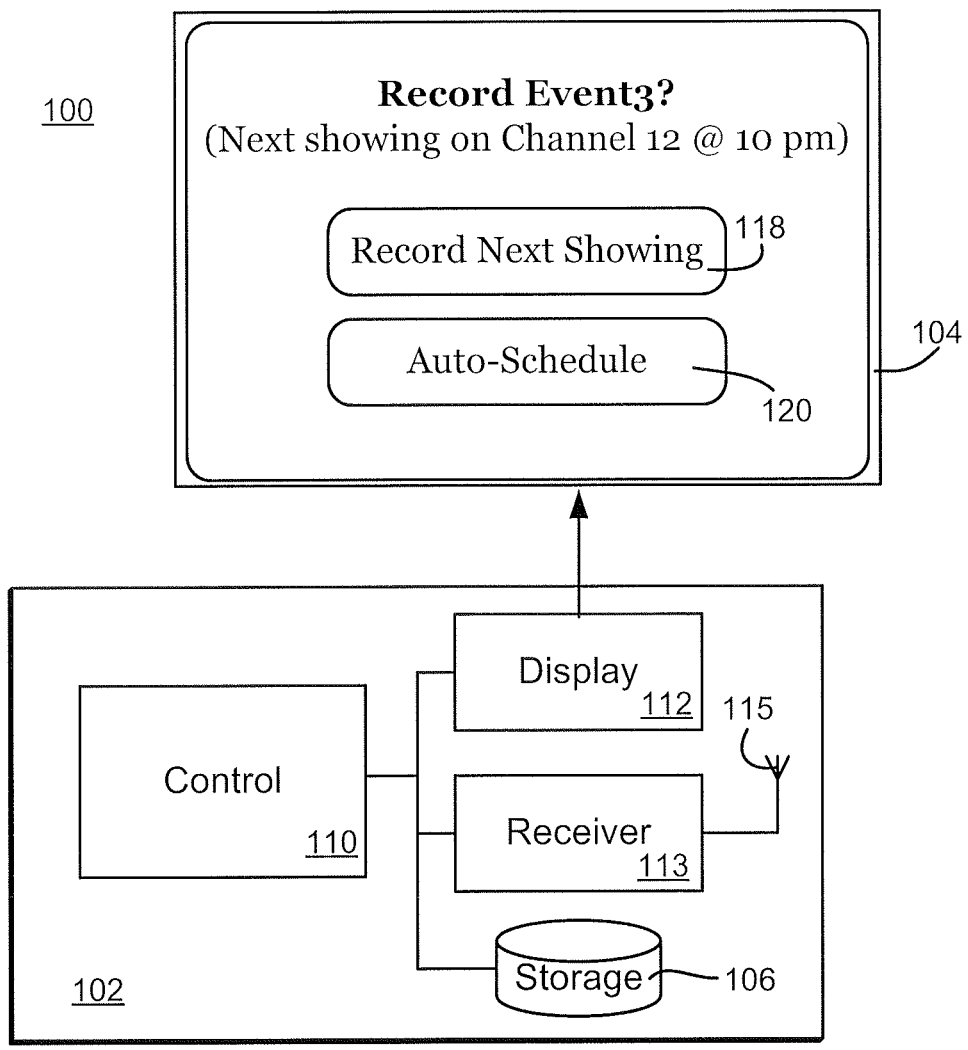
FIG. 1 is a block diagram of an exemplary system that is capable of receiving and recording programming content.

Turning now to the drawing figures and with initial reference to FIG. 1, an exemplary system 100 automatically resolves at least some conflicts in scheduled recordings by considering subsequent re-broadcasts of one or more desired programs. System 100 as shown in FIG. 1 suitably includes any sort of recorder 102 that stores received programming on a disk, memory or other storage media 106 for later retrieval and viewing. In some implementations, recorder 102 is implemented with any sort of digital video recorder (DVR) or personal video recorder (PVR) device or logic. In the exemplary embodiment shown in FIG. 1, recorder 102 is a hybrid receiver/DVR device that also includes a display interface 112 to a television or other display 104, as well as a receiver interface 113 for receiving direct broadcast satellite (DBS), cable, terrestrial broadcast, streaming video, and/or other programming. Conventional set top boxes (STBs), for example, commonly incorporate DVR features that record received broadcast programming on an electromagnetic, optical, solid state or other storage media 106.

Recorder 102 is any sort of device, system or other logic that is capable of automatically scheduling recordings of programming events selected by a viewer according to a recording schedule. Viewers may select programs to record in any conventional manner. Many implementations provide a conventional electronic program guide (EPG) or similar feature that allows viewers to identify and select programs to record; other interfaces and other selection features may also be provided. In addition to selecting programs to record, viewers may be able to specify if a program is to be recorded at a particular time (e.g., during the next available broadcast) or if the program may be automatically scheduled to reduce or avoid conflicts with other programs. In the example of FIG. 1, the viewer is able to select feature 118 to prioritize recording at a particular time or feature 120 if automatic scheduling is acceptable. Features 118 and 120 may be implemented as electronic buttons or any other selection features within a conventional DVR display or other interface. The particular appearance of the interface shown in FIG. 1 is simply for illustrative example, and such features may appear differently in any number of practical implementations.

Many types of recording devices 102 may be fashioned using any sort of hardware, firmware and/or software logic. In the example shown in FIG. 1, recorder 102 operates under the control of an appropriate controller 110 that coordinates the receiving, storage and display of programming content in response to inputs from the viewer. To that end, controller no is any sort of microprocessor, microcontroller, digital signal processor or other programmable hardware capable of directing the actions and processes of recorder 102. In various embodiments, recorder 102 is based upon a "system on chip" (SoC) implementation that incorporates a microcontroller with memory, input/output and other features to perform the various signal processing and other actions of recorder 102. Various SoC and other integrated hardware implementations are available from Texas Instruments, Conexant Systems, Broadcom Inc., and many other suppliers as appropriate. Other embodiments may implement controller no and/or the other features of recorder 102 with any number of discrete and/or integrated processing components (e.g., any sort of microprocessor or microcontroller), memories, input/output features and/or other features as desired.

The exemplary recorder 102 in FIG. 1 includes a display interface 112 that provides any sort of physical and/or logical interface to a television or other display 104. In conventional embodiments, recorder 102 provides video output signals to an external display 104 using any compatible format such as component video, S-video, High-Definition Multimedia Interface (HDMI), Digital Visual Interface (DVI), IEEE 1394, and/or any other formats as desired. Other embodiments may provide placeshifting functionality or other outputs to any sort of local or remotely-located displays 104 as desired.

In the example of FIG. 1, receiver interface 113 is any receiver, demodulator or other interface capable of receiving television or other media programming from an antenna 115 or other source. Receiver interface 113 may be implemented using any sort of conventional satellite, cable and/or broadcast television receivers, for example, although other embodiments may alternately or additionally provide interfaces to data networks and/or any other media sources. In some implementations, receiver interface 113 includes multiple tuners, demodulators and/or other resources that are each capable of receiving simultaneous programming from one or more sources. A conventional STB implementation of a DBS receiver, for example, might be capable of receiving two or more simultaneous programs from a satellite source as well as one or more programs from a terrestrial broadcast, cable, data network or other source. A cable receiver may similarly receive multiple simultaneous programs from any number of cable, direct broadcast, streaming and/or other sources. Although FIG. 1 shows a single receiver interface 113 and a single antenna 115, equivalent embodiments may include multiple tuners or other capabilities for receiving any number of simultaneous signals from any number of sources.

As noted above, recorder 102 is able to automatically resolve scheduling conflicts between desired programming events that are simultaneously broadcast if one or more of the conflicting events is subsequently re-broadcast at a later time. This "automatic" resolution takes place, in many cases, without substantive input from the viewer other than identification of a desired program and, in some embodiments, a priority level. By automatically identifying and scheduling subsequent re-broadcasts of desired programs, recorder 102 is able to make more efficient use of receiving and/or recording resources while still recording most, if not all, of the programs desired by the viewer.

Figure 2:
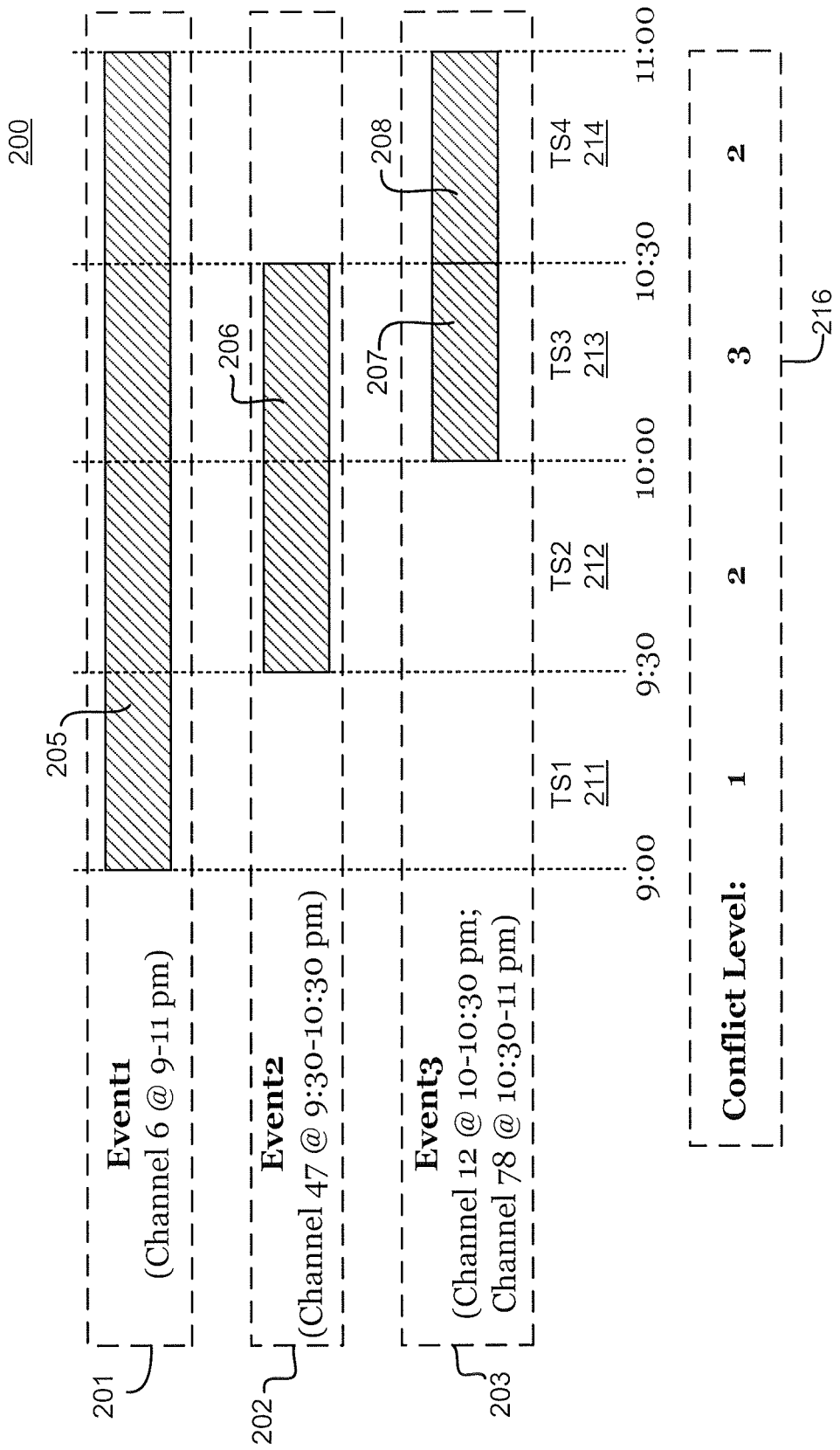
FIG. 2 shows an illustration of an exemplary recording scenario in which three desired programming events span four time slices.

FIG. 2 shows an example scenario 200 in which the viewer wishes to record three different programming events 201, 202, 203 over the course of three hours (i.e., from 9:00 pm to 11:00 pm in this example). FIG. 2 shows one program 205 of event 201 that spans 9:00-11:00, one program 206 of event 202 that spans 9:30 to 10:30, and two different programs 207 and 208 of event 203 that span 10:00-10:30 and 10:30-11:00, respectively. Program 208 therefore represents a re-broadcast of program 207; this re-broadcast may occur on the same channel as program 207, or on a different channel as appropriate.

As noted below, many embodiments are able to determine different times that a particular program is re-broadcast and to maintain such information in an event list. Re-broadcasts may be identified using, for example, program guide data such as any sort of code or other indicia contained within the EPG.

While some embodiments may use system-wide codes that are able to identify re-broadcasts on different channels, other embodiments may be limited to identifying re-broadcasts on the same channel or network, as appropriate. Re-broadcasts may be identified across any desired time period. Note that re-broadcasts need not be exactly identical to the original event; some embodiments may consider standard definition re-broadcasts of high-definition programming, for example, or vice versa. Further, although FIG. 2 shows a two-hour time period for convenience, other embodiments may consider time windows of days, weeks or more to accommodate any number of events 201-203, programs 205-208 and time slices 211-214. The particular time window may be limited by the amount of EPG data available, but may be otherwise configured as desired.

Various embodiments analyze the time period of interest by isolating different time slices 211-214 in which different programming conflicts occur. Each time slice 211-214 represents a period of time in which at least one resource is used in recording one or more programming events. An example of a "resource" could include a tuner/demodulator or other feature of receiver interface 113 that is used to receive programming on a particular channel. As noted above, many conventional recorders 102 may be able to simultaneously receive programming on different channels by using different tuners, demodulators, decoders and/or other resources as desired. A conventional STB, for example, may be able to receive two simultaneous cable or DBS channels, as well as an over-the-air (OTA) terrestrial broadcast. Other embodiments, however, may have any number of available resources for recording, and indeed some embodiments may be limited to recording a single program at a time.

Each time slice 211-214 extends for the appropriate period of time in which the demand for recording resources remains consistent. If two hour-long programs overlap by five minutes, for example, this could be represented as a first time slice for the first fifty-five minutes of the first program, a second time slice for the five minute overlap, and a third time slice for the last fifty-five minutes of the second program. Although the four time slices 211-214 shown in the example of FIG. 2 each represent thirty minute periods of time, in practice the various time slices are more likely to exhibit different lengths that are not necessarily equal to each other.

Various embodiments assign a value of a conflict level 216 to each time slice 211-214. The conflict level 216 identifies the number of unique programming events 201-203 occurring during the time slice 211-214. Scenario 200, for example, shows one program 205 occurring in time slice 211, two programs 205 and 206 occurring in time slice 212, three programs 205, 206, 207 occurring in time slice 213, and two programs 205 and 208 occurring in time slice 214. Conflict levels 216 shown for time slices 211, 212, 213 and 214 are therefore 1, 2, 3 and 2, respectively. Note that the conflict level 216 reflects the appropriate demand for simultaneous recording; if multiple showings of the same programming event 201-203 happened to be simultaneously broadcast, there would be no need to simultaneously record multiple showings of the same program, so the conflict level 216 would reflect only one of the programs associated with that event. Conflict levels 216 can be used, in many embodiments, to automatically identify time slices for scheduling recordings of programming events 201-203, as described more fully below.

Conflicts generally occur when the conflict level 216 exceeds the number of available resources for any particular slice of time. In a recorder 102 that is only capable of two simultaneous recordings, for example, time slices with conflict levels 216 greater than two could be difficult to schedule.

In FIG. 2, time slice 213 shows three desired programs 205, 206, 207 to be recorded on the two available resources. Conventionally, viewer inputs would be obtained to manually select which of the three programs 205, 206, 207 should or should not be recorded. Often, the skipped program was determined according a priority level assigned to each program, with the lowest priority level being skipped entirely. Automatic conflict resolution, however, can be used to identify and schedule recording of re-broadcast program 208 rather than original broadcast program 207, thereby freeing up recording resources that can be used to record programs 205 and 206. The result is that all three programming events 201, 202, 203 are recorded, with only a slight delay in the recording of event 203. Again, this scheduling can occur automatically, without manual re-scheduling by the viewer, in many implementations.

Automatic scheduling may be implemented in any manner. FIG. 3 shows an example of a controller 110 (also shown in FIG. 1) that can be used to provide automatic scheduling features in any appropriate recorder 102 device or system. Generally speaking, automatic scheduling is implemented in a software or firmware application 310 that can be stored in any sort of memory 302 and executed by any conventional processor 304. Typically, processor 304 operates under the direction of any appropriate operating system 308, such as any version of the LINUX operating system or the like. Operating system 308 also allows application 310 to access input/output features 306, such as interfaces 112, 113 and/or storage media 106. Processor 304, memory 302 and input/output features 306 may be implemented in some embodiments using the SoC or other components described above; other embodiments may use other discrete or integrated components as desired.

Software application 310 suitably includes any sort of auto-scheduling logic 312 that is able to create and process data in any format. In various embodiments, software logic 312 processes data that is stored in three data structures corresponding to a recording schedule 314, an events list 316, and a conflict list 318 as appropriate. Each of these structures is stored in memory 302, mass storage (e.g., storage medium 106), and/or any other location as desired for efficient operation.

Events list 316 as shown in FIG. 3 describes each programming event 201-203 that the viewer wishes to record, along with a list of available times that the specific event 201-203 can be recorded. A flag or other indicator 317 is also shown for each event 201-203 to indicate whether the event 201-203 has been scheduled for recording. In various embodiments, events list 316 is formatted as an appropriate data structure, such as an array of programming events each associated with an appropriate list of available record times. The available times may be represented as time slices (e.g., time slices 211-214 in FIG. 2), or in any other information that is readily convertible to time slice data. Events list 316 may be created at any time, and may be updated with information from the EPG or another source as additional programming events 201-203 are input by the viewer. Temporal data (e.g., potential recording times or time slices) may be stored within the list associated with each event 201-203 in chronological order to facilitate convenient processing, as described more fully below. Some embodiments store a copy of events list 316 on media 106 or in other mass storage in some embodiments to facilitate convenient retrieval and updating at later times, as desired.

Conflict list 318 is a list of time slices 211-214 associated with unscheduled events 201-203 or that are otherwise used in resolving scheduling conflicts. In various embodiments, conflict list 318 is formatted as an appropriate data structure to represent each time slice of interest along with a listing of potential events that could be scheduled during that time slice. Conflict list 318 in FIG. 3, for example, represents the information shown in the exemplary scenario 200 of FIG. 2 by listing each time slice 211-214 along with events 201-203 having programs that are available during the relevant time slice. Other embodiments may equivalently process programs 205-208 in addition to or in place of events 201-203, as desired. Conflict list 318 also tracks a number 319 of resources available during each time slice 211-214. Time slices 211-214 are maintained in chronological order in some embodiments to facilitate efficient conflict resolution, as described more fully below. Although FIG. 3 shows conflict list 318 as additionally storing conflict level 216, other embodiments may simply count the number of elements in the event list to determine the conflict level 216 as needed.

As described more fully below, the number 319 of resources available is compared to the conflict level 216 associated with each time slice to determine if sufficient resources are available to process one or more recordings during that time slice. Although the example of FIG. 3 shows two resources available for each of the time slices 211-214, in practice the number 319 of available resources may vary between time slices 211-214. If a higher priority programming event is being recorded during the time slice, for example, the higher priority event may not appear in the conflict list 318, but the number 319 of resources available will reflect that one or more resources used to record the higher priority event is not available.

Recording schedule 314 provides information that allows resources in recorder 102 to be allocated on an efficient basis so that most, if not all, of the programming events 201-203 desired by the viewer are recorded. As shown in FIG. 3, recording schedule 314 provides a listing of time slices 211-214 and programming events 201-203 that are recorded during each time slice. The exemplary embodiment of FIG. 3 shows the various time slices 211-214 arranged in a table format grouped by event 201-203 for clarity; other embodiments, however, may simply list the time slices 211-214 in chronological order, as appropriate. FIG. 3 also shows a common schedule 314 for both recording resources available to recorder 102, with the particular resource allocated to the event 201-203 having an appropriate identifier 315 that is maintained within the schedule 314. Equivalent embodiments could keep a separate schedule 314 for each resource, as desired for the particular implementation.

Application 310 creates, supplements and maintains the various tables 314, 316, 318 to efficiently schedule recordings and to automatically resolve conflicts, as described more fully below. Tables 314, 316 and/or 318 may be updated in real-time (or near real-time) as viewer inputs identifying newly-added programming events 201-203 are received; other embodiments will update the tables on any regular or irregular temporal basis as desired. Application 310 may provide other features. In various embodiments, the features described herein are incorporated within conventional DVR applications 310 that execute on any sort of STB or other receiver, DVR device or other recorder 102 as appropriate. The particular processes and functions executed within application 310 therefore vary widely from embodiment to embodiment.

Figure 4:
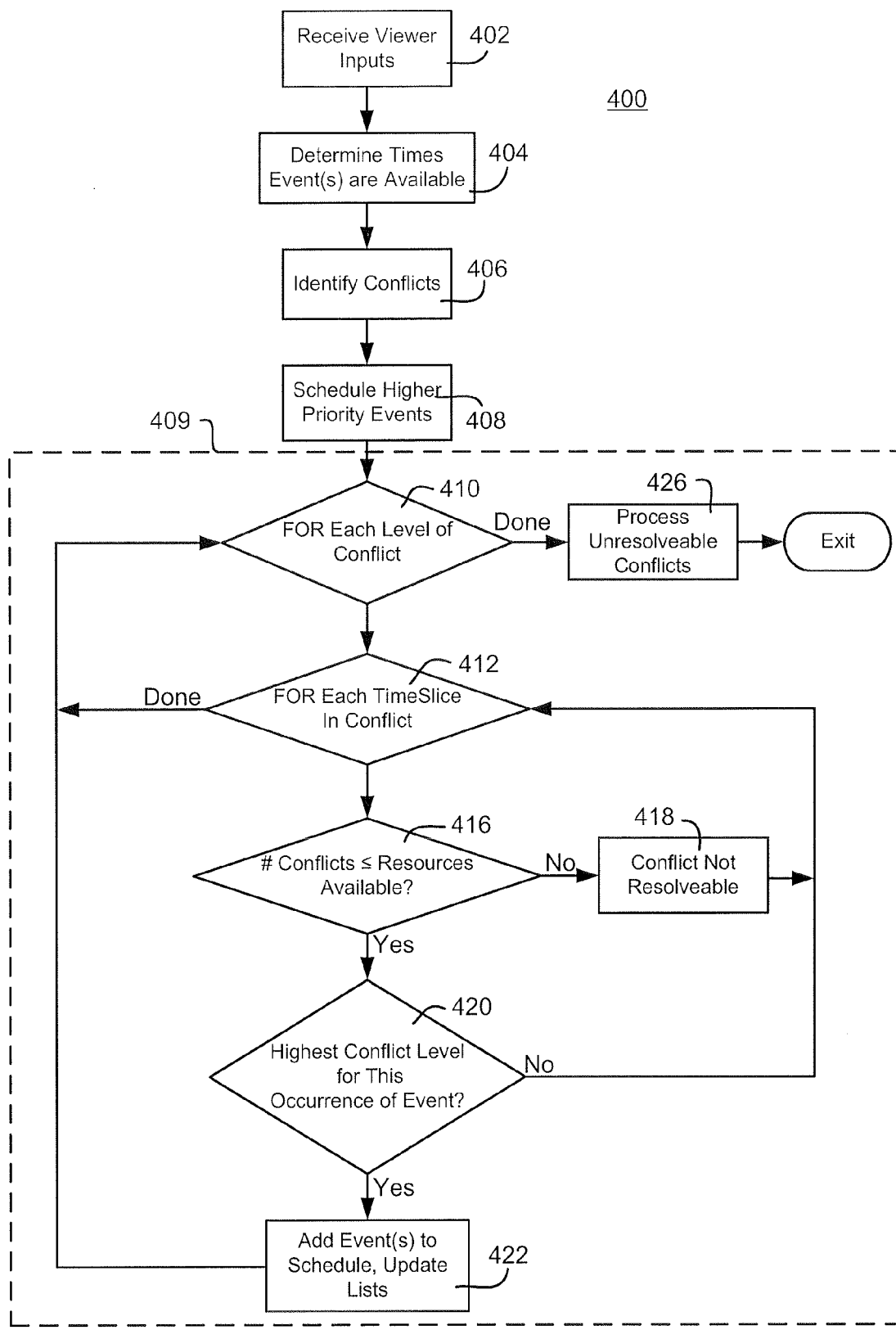
FIG. 4 is a flowchart of an exemplary process for automatically scheduling programming events.

With reference now to FIG. 4, an exemplary process 400 executable by auto-scheduling logic 312 or another portion of application 310 is shown using various functional blocks 402-426 including functions to determine times during which each of the programming events 201-203 will be available (function 404), identifying conflicts in the times during which the programming events are available (function 406), and automatically resolving the conflicts to thereby create a recording schedule 314 by which each of the programming events 201-203 is to be recorded (function 409). Other functions and features may be provided, as described more fully below. Many equivalent embodiments may modify, differently arrange and/or supplement the functions shown in FIG. 4 in any manner; other embodiments may omit certain functions, as desired.

Process 400 may be executed in real-time, near real-time (e.g., accounting for slight processing delays due to higher priority processes or events), in accordance with a schedule, in response to a timer or interrupt, or in accordance with any other temporal scheme. In the example of FIG. 4, process 400 begins when a viewer provides one or more inputs (function 402) that identify one or more programming events 201-203 to be recorded. These events may be identified from the EPG or from any other interface. In various embodiments, the viewer also provides a priority indication, such as an indication of a priority level, or a preference for recording a particular showing instead of allowing automatic scheduling. Display 104 in FIG. 1 shows one example of an interface for providing approval for automatic scheduling, although other embodiments may provide priority or other input data in any other manner. Other embodiments may provide different levels of priority, or may eliminate prioritization entirely.

Available times for programs associated with each programming event 201-203 are determined in any manner (function 404). In various embodiments, events list 316 is maintained with current program time information for each programming event 201-203 supplied by the viewer. Program time information may be obtained from an EPG or other feature provided by recorder 102. Other embodiments may query a remote database or other server for appropriate timing information, as desired. Various programs 205-208 associated with each programming event 201-203 can be identified using episode codes or other information so that re-broadcasts of each event 201-203 are identified and stored in events list 316. In various embodiments, function 404 also includes recognition of time slices 211-214, as described above. Such time slices 211-214 may be stored within events list 316 in an ordered or other appropriate fashion.

Conflicting recordings are identified in any manner (function 406). In various embodiments, conflict list 318 is created and maintained to keep track of time slices 211-214 in which potential conflicts exist, or that are otherwise analyzed to resolve conflicts. As noted above, conflict list 318 is an appropriate data structure that maintains an orderly list of time slices 211-214 and the various programming events 201-203 having programs that are receivable during the time slice. Conflict list 318 may also track the number 319 of recording resources that are available during the time slice and/or the conflict level 216 associated with the time slice, as desired.

In embodiments that allow the viewer to select a priority of the programming events, higher priority events are appropriately scheduled prior to lower priority events (function 408). Embodiments that simply allow the user to specify whether programming events 201-203 are to be statically scheduled at a particular time or automatically scheduled, for example, could place the static events into schedule 314 before executing the automatic conflict resolution functions 409 to ensure that the higher priority programming is scheduled in advance of lower priority programming. Other embodiments may provide additional levels of prioritization, thereby allowing static and/or automatic scheduling of higher priority events prior to scheduling of lower priority events. If higher priority events are added to schedule 314 for one or more time slices 211-214, the number of resources available 319 for the time slice 211-214 would be adjusted as appropriate.

Automatic resolution of recording conflicts (function 409) may occur in any manner. In the example shown in FIG. 4, various functions 410-425 are appropriate executed to identify time slices 211-214 that can accommodate recording of one or more programming events 201-203, to schedule recording of the events during the identified time slices, and to maintain accurate tables 314, 316, 318 for subsequent processing. Other embodiments, however, may perform automatic scheduling or conflict resolution using different functions, logic and/or algorithms, as desired.

The exemplary embodiment shown in FIG. 4 shows decision logic that implements a number of processing loops to ensure that each time slice 211-214 is processed in an orderly fashion. Various embodiments consider each of the time slices 211-214 in the conflict list 318 by resolving conflicts at lower conflict levels 216 (function 410) before resolving higher conflict levels. Time slices 211-214 may be further considered in chronological order (e.g., proceeding in order beginning at the present time) to further improve efficiency, and to identify the earliest recording opportunities that will meet the viewer's criteria. Each of the time slices 211-214 is generally considered in order (function 412), as appropriate. Function 409 as shown in FIG. 4 therefore considers lower conflict levels 216 before considering higher level conflicts (function 410), and also considers each of the time slices 211-214 having the same conflict level 216 in temporal or another appropriate order (function 412).

For each time slice 211-214 being evaluated, the conflict level 216 is compared to the number 319 of available resources (function 416). If the number of conflicts is greater than the number of available resources, then the time slice 211-214 is at least temporarily unresolvable (function 418), and processing moves to another time slice 211-214 (function 412). If the number of conflicts 216 is less than or equal to the number 319 of resources available, however, then the time slice is a candidate for further consideration.

Before adding the times slice to the schedule 318, various embodiments evaluate each of the other time slices corresponding to the same programs that are present in the time slice of interest to determine if the time slice represents the highest conflict level 219 for each of those programs 205-208 (function 420). This prevents premature resolution of easy conflicts that may lead to difficulties in resolving more complex conflicts in other time slices. Stated another way, function 420 provides that the most difficult conflict for any particular program 205-208 is resolved first, and that no other conflicts are present before the schedule 314 is updated. Function 420 can, however, ignore programs in the other time slices that correspond to programs that are considered for recording. That is, if the schedule is updated to include the program(s) present in the currently-analyzed time slice, then it would not be necessary to consider other programs associated with the same event in the other time slices; an example of this is presented below. The other time slices may be further evaluated in function 420 to identify any further conflicts or other issues.

When a time slice 211-214 is fully evaluated and confirmed to be acceptable, then the recording schedule 314 and/or other tables 316, 318 can be updated (function 422). Each of the time slices 211-214 spanning the programs 205-208 can be added to the programming schedule 314, as appropriate, so that the entire program 205-208 corresponding to the desired programming event 201-203 is recorded. The "scheduled" indicator 317 in events table 316 is appropriately updated for each of the events 201-203 that are added to the schedule to indicate that the events 201-203 have indeed been added to the recording schedule 314. Conflict list 318 is also updated to remove any time slices 211-214 that no longer need to be considered, and/or to adjust the numbers 319 of available resources and the listing of events in the remaining time slices 211-214.

After the schedule 314 and other lists 316, 318 are properly updated, various embodiments allow automatic conflict resolution 409 to begin anew at the lowest conflict level 216 (function 410) to consider each of the remaining time slices 211-214 in conflict list 318 (function 412) from the beginning of the event list 316. The re-start of automatic resolution 409 allows for re-consideration of time slices that may have had unresolvable conflicts in earlier iterations of function 409.

After automatic conflict resolution 409 is complete for all of the time slices 211-214, then any unresolvable conflicts can be processed as appropriate (function 426). In various embodiments, the unresolvable conflicts are identified by the "scheduled" indicator 317 in events list 316. That is, any remaining unscheduled events 201-203 can be determined to be unresolvable using function 409. Such conflicts may be resolved with additional input from the viewer in some embodiments. Alternately, unscheduled programs are simply be identified to the viewer, highlighted in event table 316 for further processing, or otherwise addressed in any appropriate manner.

The automatic resolution function 409 shown in FIG. 4 can be applied to the exemplary scenario 200 described in FIG. 2 as one illustrative example of a scheduling technique that considers future re-broadcasts of programming events in automatically resolving recording conflicts between programming events 201-203. Beginning with the time slices having the lowest conflict levels 216 (function 410), the first time slice to be considered is slice 211, which has a conflict level 219 of one, with two available resources. Even though function 416 would typically identify time slice 211 as a candidate for further consideration, function 418 would recognize that program 205 spans time slices 211-214, and that time slice 213 has a conflict level of three. Function 420 recognizes that time slice 213 is a more complex conflict than time slice 211, and therefore declines to add slice 213 to schedule 314 at this point.

Time slices 212 and 214 each have a conflict level 216 of two, so these would be considered next according to function 410. Because time slice 212 is first in time (function 412), it is considered prior to slice 214. Both programs 205 and 206 in slice 212 span time slice 213, however, which has a higher conflict level 216 than time slice 214. Function 420 therefore declines to add programs from time slice 214 to the schedule 314 during this iteration.

Time slice 214, however, has a resolvable conflict even though it may appear, at first glance, to have a lower conflict level 2116 than slice 213. Even though slice 213 encompasses three potential programs 205, 206, 207, program 208 is a re-broadcast of program 207. There would therefore be no need to record program 207 if program 208 were added to the recording schedule 314 during time slice 214. Hence, time slice 213 has an effective conflict level 216 of two in comparison to time slice 214, thereby placing time slices 213 and 214 at the same conflict level 216 for purposes of function 420. Programs 205 and 208 in time slice 214 can therefore be added to programming schedule 314, as desired. Further, conflicts table 318 can be updated to remove time slices 211 and 214 from future processing (since these time slices no longer contain conflicts). The records associated with time slices 212 and 213 can also be updated to remove programs 205 and 207 associated with events 201 and 203, respectively, and to indicate that only one resource is available (since the other resource is now scheduled to record program 205). Additionally, events 201 and 203 may be marked as "scheduled" in events table 216. A subsequent iteration of function 409 would then recognize that program 206 could be recorded with the remaining resource in time slices 212 and 213, so this recording could be added to schedule 314. Again, this scenario is a simple illustration of one example of a function 409 to automatically resolve conflicts in recording schedules 314. Other embodiments may operate in any other manner, using different functions from those shown in FIG. 4.

Each of the various functions 402-426 may be implemented in software, firmware or other logic that is stored in memory 302 or elsewhere, and that is executed by processor 304 or other appropriate circuitry associated with controller 110 or the like within recorder 102. Equivalent embodiments may partially or wholly implement the various functions of process 400 using dedicated hardware logic, for example in an application specific integrated circuit (ASIC), programmable logic array (PLA) or the like. Other embodiments may use any equivalent hardware, firmware and/or software means to implement the various functions shown in FIG. 4 in any desired manner.

The above discussion therefore presents various examples of systems, devices and processes that are able to automatically resolve scheduling conflicts in recording programming events on a DVR or similar recorder. Equivalent systems, devices and processes could be used to schedule any sort of data processing, signal receiving, mechanical or other resources in any environment, including any sort of computing, manufacturing or other environment.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method executable by a processor to automatically schedule recordings of a plurality of programming events using a plurality of recording resources that are available to the processor, the method comprising:
automatically generating an event list using the processor, wherein the event list comprises, for each of the programming events, at least one of a plurality of time slices representing times during which the programming event is scheduled to occur, wherein multiple broadcasts of the same programming events are represented with different time slices, and wherein each of the plurality of time slices represents a period of time in which at least one of programming events is scheduled to occur and in which the demand for recording resources remains consistent;
automatically identifying, with the processor, conflicts occurring during each of the time slices to thereby assign a conflict level to each time slice representing the number of programming events that are available during that time slice; and
automatically creating a schedule without user input based upon the time slices using the processor by which each of the programming events is to be recorded, wherein the creating comprises automatically selecting time slices based upon the conflict levels of the time slices, scheduling programming events occurring within the selected time slices for recording using the programming resources during the selected time slices, and updating the event list as time slices are scheduled for recording.

2. The method of claim 1 wherein the identifying comprises compiling a conflict list based upon the event list, wherein the conflict list identifies those time slices in which more than one of the programming events will occur.

3. The method of claim 2 wherein the creating comprises the processor automatically selecting time slices in the conflict list in which a number of programming events occurring during the time slice does not exceed a number of available resources.

4. The method of claim 3 wherein the creating further comprises the processor automatically adding the time slices associated with one of the programming events occurring during the time slice to the recording schedule and updating the conflict list in response to the adding.

5. The method of claim 4 wherein the event list comprises, for each of the programming events, an ordered list of the time slices in which the programming event will occur, and wherein the creating considers each of the time slices in the conflict list in temporal order moving forward from a present time.

6. The method of claim 5 wherein the resolving comprises the processor considering those time slices with fewer conflicts before considering time slices with more conflicts.

7. The method of claim 6 wherein the resolving further comprises the processor considering, for a time slice of interest having programs to record, each of the other time slices corresponding to the same programs to record during the time slice of interest to determine if the time slice of interest represents the highest conflict level for each of the programs to record during that time slice of interest and, if so, scheduling the time slot of interest for recording of at least one of the programs to record, and otherwise not scheduling the time slot of interest for recording.

8. The method of claim 1, wherein some of the programming events are identified as having higher priority than other recording events, and wherein the method comprises placing the higher priority programming events into the recording schedule prior to automatically resolving the conflict resulting from the other recording events, and wherein the method further comprises automatically reducing a number of resources available for recording other programs while the higher priority programming events are being recorded.

9. A system to record a plurality of programming events, the system comprising:
a receiver interface configured to receive the programming events;
a plurality of recording resources configured to record programming events received via the receiver interface;
a storage medium configured to store the programming events; and
a controller configured to:
automatically generate an event list using the processor, wherein the event list comprises, for each of the programming events, at least one of a plurality of time slices representing times at which each of the plurality of programming events will be broadcast, wherein multiple broadcasts of the same programming events are represented with different time slices, and wherein each of the plurality of time slices represents a period of time in which at least one of the programming events is scheduled to occur and in which the demand for the recording resources does not change;

automatically identify conflicts occurring during each of the time slices to thereby assign a conflict level to each time slice representing the number of programming events that are available during that time slice; and automatically create a schedule without user input for the recording resources based upon the time slices, wherein each of the programming events is recorded to the storage medium by one of the recording resources, wherein the schedule is created by automatically selecting time slices based upon the conflict levels, by scheduling programming events occurring within the selected time slices for recording during the selected time slices, and by updating the event list as time slices are scheduled for recording.

10. The system of claim 9 wherein the controller is further configured to automatically identify the conflict by compiling a conflict list based upon the event list, wherein the conflict list identifies those time slices in which more than one of the programming events will occur, and wherein the controller is further configured to resolve the conflict by sequentially processing the conflict list with those time slices having lower levels before processing those time slices having higher conflict levels.

11. The system of claim 10 wherein the controller is further configured to resolve the conflicts by automatically selecting time slices in the conflict list in which a number of programming events occurring during the time slice does not exceed a number of available resources.

12. The system of claim 11 wherein the processor is configured to further consider, for a time slice of interest having programs to record, each of the other time slices corresponding to the same programs to record during the time slice of interest to determine if the time slice of interest represents the highest conflict level for each of the programs to record during that time slice of interest and, if so, scheduling the time slot of interest for recording of at least one of the programs to record, and otherwise not scheduling the time slot of interest for recording.

13. A method executable by a processor to schedule recording of a plurality of programming events spanning a plurality of time slices using a plurality of recording resources, the method comprising:

generating an event list using the processor, wherein the event list comprises, for each of the programming events, at least one of the time slices in which the programming event will occur, and wherein multiple occurrences of the same programming event are represented with different time slices, and wherein each of the plurality of time slices represents a period of time in which the demand for recording resources does not change;

compiling a conflict list based upon the event list by the processor, wherein the conflict list identifies those time slices in which at least one of the programming events will occur, wherein each of the time slices is assigned a conflict level representing the number of programming events that are available during that time slice; and automatically resolving the conflicts using the processor to thereby create a recording schedule based upon the time slices without user input by which each of the programming events is to be recorded, wherein the schedule is created by automatically selecting time slices based upon the conflict levels of the time slices, scheduling programming events occurring within the selected time slices for recording during those time slices, and updating the event list as time slices are scheduled for recording.

14. The method of claim 13 wherein the selecting comprises identifying time slices in which a number of programming events occurring in the time slice does not exceed a number of resources available for recording during the time slice.

15. The method of claim 14 wherein the resolving further comprises adding each of the time slices associated with a particular occurrence of the programming events during the time slice to the recording schedule and updating the conflict list in response to the adding.

16. The method of claim 15 wherein the resolving further comprises, prior to adding the time slices associated with the particular one of the programming events occurring during the time slice to the recording schedule, that the time slice comprises the most conflicts of any time slice associated with the particular one of the programming events occurring within the time slice.

17. The method of claim 13, wherein some of the programming events are identified by a user as having a higher priority than other programming events, and wherein the method comprises scheduling the time slices for recording prior to automatically resolving conflicts with the other programming events.

\* \* \* \* \*